United States Patent [19]
Plummer

[11] 3,709,131
[45] Jan. 9, 1973

[54] METHOD AND APPARATUS FOR ALIGNING A VIEWING SYSTEM

[75] Inventor: William T. Plummer, Concord, Mass.

[73] Assignee: Polaroid Corporation, Cambridge, Mass.

[22] Filed: Dec. 28, 1971

[21] Appl. No.: 213,020

[52] U.S. Cl. ............................ 95/39, 95/11 V, 95/42
[51] Int. Cl. ..................... G03b 13/10, G03b 17/04
[58] Field of Search .......................... 95/39, 42, 11 V

[56] References Cited

UNITED STATES PATENTS

3,653,313 4/1972 Leduc ........................................ 95/42

Primary Examiner—Robert P. Greiner
Attorney—John A. Vale et al.

[57] ABSTRACT

A photographic apparatus having a variable geometry housing, an optical system, operative in a viewing mode for providing an image, mounted on the housing such that the performance of the optical system in terms of image brightness depends upon the geometry of the housing, and an assembly for adjusting the geometry of the housing for optimum image brightness. A method is also presented for observing the alignment of the optical system and adjusting the same.

29 Claims, 5 Drawing Figures

PATENTED JAN 9 1973

INVENTOR.
WILLIAM T. PLUMMER

BY Brown and Mikulka
and
John S. Vale
ATTORNEYS

INVENTOR.
WILLIAM T. PLUMMER

BY
Brown and Mikulka
and
John S. Vale
ATTORNEYS

3,709,131

METHOD AND APPARATUS FOR ALIGNING A VIEWING SYSTEM

FIELD OF THE INVENTION

The present invention is concerned with photographic apparatus and more particularly with compact, folding, single lens reflex cameras.

BACKGROUND OF THE INVENTION

The present invention relates to providing means and a method for making a simple adjustment to a compact, folding, single lens reflex camera, after it has been assembled, to "factory align" the camera's optical system. More specifically, this invention is directed to means and a method for aligning the optical system, when it is configured in a viewing mode, to optimize the brightness of an image visibly displayed by the camera's viewing device.

Copending application, Ser. No. 141,554, filed on May 10, 1971 discloses a compact, folding, single lens reflex camera that is representative of a class of folding cameras which utilize the kinematics of a four-bar linkage for moving component parts of the camera between an inoperative folded position and an operative extended position.

It is well known in the mechanical art that a four-bar linkage consists of four rigid elements or links pivotally coupled in end-to-end relation to form a closed loop.

One link is designated as a reference link and for the purpose of kinematic analysis is considered to be fixed or to have no absolute motion. The motion of the linkage then may be analyzed in terms of the motion of the three remaining links relative to the reference link and relative to one another.

The two links pivotally coupled to the opposite ends of the reference link serve as cranks and their motion relative to the reference link is rotational. One of the cranks functions as a driver, the other as a follower. The remaining link, coupled between the movable ends of the driver and follower links, functions as a connecting rod to transfer motion of the driver link to the follower link. The type and degree of relative motion of the connecting rod link varies depending on the relative length of the four links forming the four-bar linkage.

There are certain inherent characteristics associated with a four-bar linkage that make this type of structure especially well suited for incorporation into a folding camera. For example, the relative motion of the links is predictable or determinate. This characteristic distinguishes a four-bar linkage from a three-bar linkage in which there is no possible relative motion of the links, or a five-bar linkage in which there is an overabundance of possibilities of relative motion. Another useful characteristic of a four-bar linkage is that the type and degree of predictable relative motion may be varied by varying the relative length of the four links. Also, the motion of the four-bar linkage may be arrested by arresting the relative motion of any two of the four links.

In other words, once the relative lengths of the four links in a specific four-bar linkage have been established, the dynamics of each of the links is predictable. Upon arresting the motion of the four-bar linkage and knowing the angle between any two adjacent links, the static geometry of the linkage in terms of the spatial relation of the four links is predictable. Stated another way, the static geometry of the linkage may be varied in a predictable manner by changing the angle between any two adjacent links.

The folding camera disclosed in the above-mentioned application includes a variable geometry housing which is movable between folded and extended positions by applying the kinematic principles of a four-bar linkage. The variable geometry housing includes at least four rigid housing sections which are pivotally interconnected in end-to-end relation to form a closed loop. Individual components of the camera's optical system are fixed to each of the four sections and by precisely controlling the location of the optical components on their respective links and controlling the length of each section, as measured between pivot points, the spatial relation of these optical components becomes predictable once the angle between any two adjacent housing sections is known.

Specifically, the variable geometry housing includes a first section having means therein for locating a film unit at an exposure plane and a focusing screen adapted to be located in overlying relation to the exposure plane when the camera's optical system is configured for viewing. This first housing section may be considered to be the reference link. A second housing section, pivotally coupled to one end of the first housing section, serves as the driver link and supports a planar mirror. A third section, coupled to the movable end of the second section, supports a viewing device and serves as the connecting rod link. The fourth housing section which supports an objective lens is pivotally coupled between the opposite end of the first housing section and the opposite end of the third housing section and serves as the follower link in the four-bar linkage.

By controlling the relative length of each section such that the combined length of the second and third housing section is substantially equal to the combined length of the first and fourth housing sections, the variable geometry housing may be folded into a flat configuration. When folded in this manner, the first and fourth housing sections are in alignment which causes the second and third housing sections to also become aligned in overlying face-to-face relation with the first and fourth housing sections thereby forming a compact parallelepiped shaped structure. It is convenient to describe the static geometry of the housing in terms of the included angle between the first and second housing sections. Since these sections are in face-to-face relation when the camera is folded, the included angle therebetween is substantially zero.

The camera is adapted to be moved from the folded position to its extended position by rotating the driver link, i.e., the second housing section, away from the reference link or the first housing section to increase the included angle therebetween. This movement causes the connecting rod link or the third housing section and the follower link or the fourth housing section to move relative to the first and second housing sections and relative to one another. When the angle between the first and second housing sections reaches a predetermined value, the four links are spaced apart to locate their respective optical components in the extended operative position.

The housing is stabilized in the extended position by means of an erecting link coupled between the first and second housing sections. One end of the erecting link is pivotally coupled to the second housing section and the opposite end of the link runs in a groove or track on the first housing section as the camera is extended until it engages a latching mechanism at the end of the track. At this point the erecting link forms a stable three-bar linkage with the first and second housing sections and is effective to stabilize the four-bar linkage such that relative motion between the housing sections is no longer possible. By controlling the length of the erecting link and its points of connection to the first and second housing sections, control is maintained over the angle between the first and second housing sections thereby fixing the spatial relation of the optical components supported by the four housing sections.

When the variable geometry housing is located in the extended position, the four rigid housing sections form four exterior walls of the camera's exposure chamber and simultaneously position their respective optical components in operative relation with one another. Specifically, a viewing and focusing mode is established such that the objective lens on the fourth housing section directs light to the planar mirror mounted on the second housing section. The light is then reflected from the planar mirror onto the focusing screen supported by the first housing section to form an image of the scene to be photographed. Light emanating from the image of the focusing screen is directed back to the planar mirror from where it is reflected through an entrance pupil into the viewing device, mounted on the third housing section, which is operative to form a second image of the scene that may be viewed through the eye lens of the viewing device.

Upon testing the optical performance of a number of assembled cameras, it was observed that in a small percentage of these cameras, the brightness of the image displayed by the viewing device was somewhat diminished from the brightness level one would normally expect. In all other respects, the optical performance of these cameras was found to be well within established tolerances.

Analysis of the problem reveals that the diminished image brightness results from misalignment of the viewing device entrance pupil with respect to a cone of light directed toward the entrance pupil by the planar mirror. The entrance pupil is relatively small in comparison to the area illuminated by the cone of light and therefore only a small portion of the cone of light actually passes into the viewing device to form the second image. In those cameras exhibiting diminished image brightness, it was found that the entrance pupil was not aligned with the central portion of the cone, which tends to be relatively bright, but rather it was aligned with an edge portion of the cone which tends to be less bright than the central portion.

Since alignment of the four optical components providing the image is established by the spatial relation of the four housing sections located in the extended position, each individual section was examined for conformity to establish manufacturing tolerances. It was determined that the misalignment was not caused by any one section, but rather by an accumulation of minor manufacturing variances acting in concert, once the camera is assembled, to distort the optical path between the lens and the viewing device entrance pupil.

Obviously, one solution to the problem is to establish more stringent manufacturing tolerances. However, this approach is undesirable because it will result in substantially higher manufacturing costs and is rather an uneconomic method for correcting a deficiency which is present in only a small percentage of assembled cameras.

SUMMARY OF THE INVENTION

The present invention provides means and a method for making a simple adjustment to an assembled camera of the type described which in effect changes the alignment of the viewing device entrance pupil with respect to the bright central portion of the cone of light reflected toward the entrance pupil by the planar mirror. Experience has shown that in order to effect such a change in alignment, the spatial relation of the four optical components must be varied in a controlled manner. If the position of only one or two components making up the viewing system is changed, optical aberrations are introduced which deteriorate the quality of the image. More importantly, it has been discovered that the control change in the spatial relation of the objective lens, planar mirror, focusing screen, and viewing device may be made by varying the static geometry of the camera housing when it is located in its extended operative position. As noted earlier, this may be accomplished by changing the included angle between the extended first and second housing sections.

In a preferred embodiment the folding, single lens reflex camera is provided with an erecting link assembly which may be adjusted to vary the angle between the first and second housing sections by changing the point at which the erecting link is connected to the second housing section.

Therefore, it is an object of the present invention to provide means and a method for making one simple adjustment to an assembled compact, folding, single lens reflex camera which causes four optical elements associated with the camera's viewing system to be simultaneously realigned in a controlled manner.

It is another object of the present invention to provide a method by which an assembled single lens reflex camera may be evaluated to determine whether its viewing system is correctly aligned to provide optimum image brightness and to provide a method for correcting a misaligned viewing system.

Another object of the present invention is to provide photographic apparatus of the type including a variable geometry housing which includes first and second housing sections whose angular relation determines the geometry of the housing, an optical system operative in a viewing mode for providing a viewable image of a scene supported by the housing such that the performance of the optical system in terms of the brightness of the viewable image is dependent upon the geometry of the housing, and means for adjusting the angular relation of the first and second housing sections to vary the geometry of the housing for optimum brightness of the viewable image.

It is yet another object of the present invention to provide a folding, single lens reflex camera of the type comprising a housing including at least four rigid sections interconnected to form a four-bar linkage which is movable between a folded position and an extended position defined by an angle between two adjacent housing sections, an optical system for providing a viewable image of a scene mounted on the housing such that the brightness of the image formed by the optical system varies with the angle between the two adjacent housing sections, erecting means for releasably securing the four housing sections in the extended position, and means for adjusting the angle between the two adjacent housing sections at which the erecting means secures the housing in its extended position for optimum image brightness.

It is yet another object of the present invention to provide a folding, single lens reflex camera of the type including an erecting link which may be adjusted to cause realignment of the camera's viewing system.

Other objects of the invention will in part be obvious and will in part appear hereinafter.

DESCRIPTION OF THE PRIOR ART

The prior art discloses a number of folding cameras which utilize the kinematic principles of a four-bar linkage for moving components of the camera between folded and extended positions. These cameras also utilize an erecting link coupled between two adjacent sections for releasably securing the housing in its extended operative position. However, these cameras do not employ a reflex viewing system. Viewing is accomplished by means of a direct viewing viewfinder-rangefinder assembly which is not optically coupled to the camera's objective lens or reflex mirror. Since there are fewer optical components in this type of system, the effect of accumulated minor manufacturing variations is less critical. Furthermore, these cameras do not provide means for adjusting the angle at which the erecting link secures the housing and its extended position. Once these cameras are assembled, that angle remains fixed. Examples of such cameras may be found by referring to U.S. Pat. Nos. 3,447,437, and 3,479,941.

The prior art also discloses cameras utilizing a plurality of adjustable links for realigning the lens and exposure plane of the camera to compensate for image distortion caused by perspective. Such cameras are generally used for architectural photography. However, each optical component in the system must be adjusted individually. There is no provision for simultaneously adjusting a plurality of optical components in a controlled manner. An example of such a camera may be found in U.S. Pat. No. 2,301,921.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
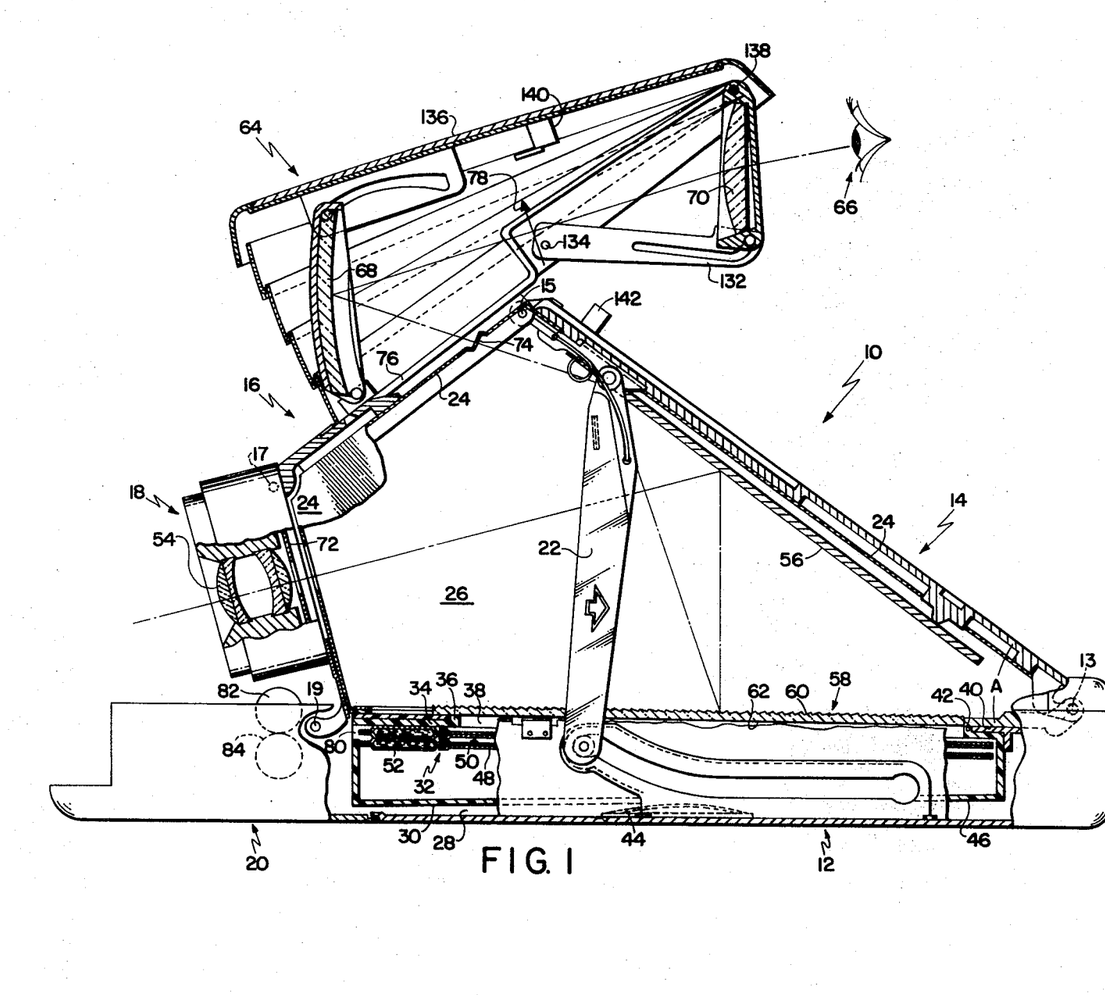
FIG. 1 is an elevational view, partly in section, of a camera embodying the instant invention shown in an extended operative position.
Figure 2:
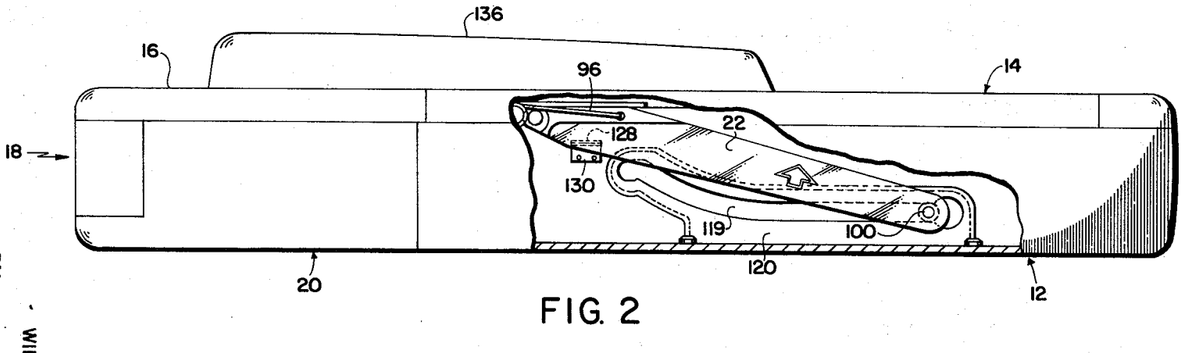
FIG. 2 is an elevational view, partly in section, of a camera embodying the instant invention shown in a folded inoperative position.

Referring now to FIGS. 1 and 2 of the drawings, a compact, folding, single lens reflex camera of the self-developing type is shown generally at 10 in its extended operative position. Camera 10 includes a variable geometry housing formed by five rigid housing sections. Sections 12, 14, 16, and 18 are pivotally interconnected at pivot points 13, 15, 17, and 19 to form a movable four-bar linkage, and section 20 is pivotally coupled to one end of housing section 12.

The four-bar linkage structure permits the geometry of the housing to be converted from the folded inoperative configuration shown in FIG. 2 to the extended operative configuration shown in FIG. 1 by rotating housing section 14 in a clockwise direction about pivot 13 until the included angle A between sections 12 and 14 reaches a predetermined value. At that point an erecting link 22 coupled between sections 12 and 14 automatically locks to releasably secure the camera in the extended position. Secured to the interior surfaces of housing sections 12, 14, and 18 is a foldable, opaque, envelope or bellows 24 which is automatically unfolded in response to moving the variable geometry housing to the extended position and cooperates with sections 12, 14, 16, and 18 to provide a lighttight exposure chamber 26 within the bounds of the four-bar linkage.

The first housing section 12 includes a chamber 28 for receiving a film container 30 preloaded with a plurality of film units 32 arranged in stacked relation therein. Access for loading film container 30 into receiving chamber 28 is provided by rotating housing 20 downwardly in a counterclockwise direction to expose an open end of chamber 28 located near the interface between housing sections 12 and 20.

Film container 30 includes a forward wall 34 having an upstanding rib 36 which defines a generally rectangular light-transmitting section or aperture 38 through which actinic radiation is adapted to pass to expose the forwardmost film unit 32. Film container 30 is supported within chamber 28, at its forward wall 34, by a plate-like support frame 40 having a rectangular opening 42 therein through which upstanding rib 36 is adapted to be inserted in telescoping fashion for accurately locating the forwardmost film unit at an exposure plane within camera 10. The forward wall 34 of the film container is securely held against support frame 40 by means of a support spring 44 secured to the interior surface of the bottom wall of housing section 12 and adapted to engage a rear wall 46 of the film container.

Film unit 32 contains all of the components required to produce a positive photographic print including a photosensitive element 48, a superposed transparent image-receiving element 50 and, joined to both elements at one end, a rupturable pod 52 containing a processing fluid which is adapted to be spread between and in contact with elements 48 and 50 subsequent to exposure for forming a positive image by a diffusion transfer process. For details as to the construction of the film units 32, reference may be had to copending application, Ser. No. 5,799, filed Jan. 26, 1970, as a continuation-in-part of Ser. No. 622,826, filed Mar. 10, 1967, by Edwin H. Land et al. and assigned to the same assignee as the instant invention.

The camera's optical system includes an objective lens 54, mounted in housing section 18, for forming an image of the scene to be photographed; a planar mirror 56, mounted on an interior wall of housing section 14, for reflecting light passing through objective lens 54 towards the exposure plane; and a plate-like reflex member 58, pivotally coupled to housing section 12 at pivot 13 for movement between a viewing and focusing position, shown in FIG. 1, and an exposure position adjacent to and parallel with the fixed planar mirror 56. Reflex member 58 has a viewing surface or focusing screen 60 on one side for displaying the image formed by objective lens 54 via reflection from planar mirror 56, and a planar reflective surface 62 on the other side, the function of which will be described hereinafter. The optical system further includes a foldable viewing device shown generally at 64 for viewing the image displayed on focusing screen 60 from an eye station designated generally at 66. The optical portion of viewing device 64 is formed by a curved mirror 68, an eye lens 70 and an entrance pupil or aperture 74 formed in bellows 24 and held in position between curved mirror 68 and planar mirror 56 by housing section 16.

Camera 10, being of the single lens reflex type, is configured to operate first in a viewing and focusing mode of operation and thereafter in an exposure and processing mode. As best seen in FIG. 1, during the viewing and focusing mode of operation, reflex member 58 rests atop support frame 40 and light-seals the film container exposure aperture 38. A normally open shutter 72, mounted between objective lens 54 and an opening in envelope 24, permits light to pass through the lens and across chamber 26 until it impinges upon mirror 56 which is positioned by housing section 14 to reflect the light onto the focusing screen 60 to form an image of the scene to be photographed. Focusing screen 60 may take the form of an echelon type mirror as diagrammatically illustrated in FIG. 1. Light emanating from the image on focusing screen 60 is reflected upwardly toward planar mirror 56 from which it is reflected toward housing section 16. The light then passes through the small aperture 74 in bellows 24 which defines the entrance pupil for the viewing device 64 and then through a larger aperture 76 in housing section 16 until it impinges upon curved mirror 68. Mirror 68 has a concave ellipsoidal shaped reflective surface which reflects the light rearwardly toward eye station 66 and forms a real, erect, and unreverted aerial image designated by a vertical arrow 78. The eye lens 70 serves to magnify the image at 78 to facilitate viewing and focusing from the eye station 66.

Figure 5:
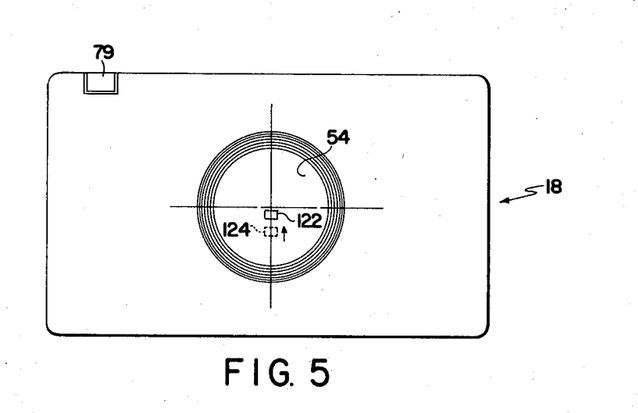
FIG. 5 is an elevational view of one housing section illustrating the position of an image of the viewing device entrance pupil as viewed through the objective lens.

In operation, the photographer views the aerial image 78 through eye lens 70 while adjusting objective lens 54 until it is in sharp focus. Once the image is in sharp focus, the photographer actuates a shutter release button 79 (see FIG. 5) on housing section 18 which is operative to initiate the following sequence of operations. First, the normally opened shutter 72 closes and reflex member 58 is pivoted upwardly about pivot 13 to the exposure position adjacent to and parallel with the fixed mirror 56. A blocking member (not shown) attached to the movable end of reflex member 58 blocks the entrance pupil 74 of viewing device 64 thereby causing exposure chamber 26 to assume a lighttight condition. Shutter 72 is then opened to admit light into exposure chamber 26. The light is reflected from the planar reflecting surface 62 on the underside of reflex member 58 onto the forwardmost film unit 32 thereby causing exposure of the film unit. After an appropriate exposure interval, the shutter again closes and reflex member 58 is pivoted downwardly to its viewing and focusing position. Once reflex member 58 caps the exposure aperture 38 in the forward wall 34 of the film container, shutter 72 is opened and the optical system assumes its viewing and focusing mode.

As reflex member 58 is being returned to its viewing and focusing position, the exposed forwardmost film unit is automatically advanced, by means not shown, forwardly through a withdrawal slot 80 in the leading end wall of film container 30 and into engagement with a pair of pressure applying rollers 82 and 84 mounted in housing section 20. Rollers 82 and 84 are adapted to be rotably driven in a direction to advance the exposed film unit 32 therebetween toward the exterior of camera 10. As the exposed film unit passes between rollers 82 and 84, they apply compressive pressure to the film unit which causes pod 52 to rupture and dispense the processing fluid which is then uniformly distributed between and in contact with photosensitive element 48 and image-receiving element 50 to initiate the diffusion transfer process.

A more detailed description of the optical system employed in the instant camera may be found in the copending U.S. Pat. application of J. G. Baker, Ser. No. 98,356, filed on Dec. 15, 1970 and assigned to the same assignee as the instant invention.

As described earlier, when camera 10 is located in the extended position and the optical system is configured for viewing (See FIG. 1), a folded optical path is established from objective lens 54 to the planar mirror 56, then to the focusing screen 60, back to mirror 56 and then through the entrance pupil 74 of the viewing device 64. For the purpose of illustration, this optical path is shown as a dotted line which represents a principle ray of light passing through objective lens 54 along its optic axis. One skilled in the art will appreciate the fact that light emerges from lens 54 in the form of a diverging bundle of rays which completely fill the focusing screen 60 after reflection from planar mirror 56. The echelon reflective surface of focusing screen 60 is configured to cause light emanating from this surface to converge such that it impinges only a very small area of mirror 56. In order to provide a focusing surface the screen 60 is roughened in a manner analogous to ground glass causing the reflected light to diverge somewhat such that the dotted line passing through aperture 74 is representative of a distribution of light rather than a single ray.

The size of the viewing device entrance pupil 74 is relatively small when compared to the diameter of objective lens 54. During the viewing mode of operation, objective lens 54 is utilized at its widest aperture and the cross section area illuminated by the cone of light is much larger than the entrance pupil aperture 74. Therefore, only a small portion of this cone of light actually passes through aperture 74 into viewing device 64 to form the image represented by arrow 78. The cone of light presented at the entrance pupil 74 is not of uniform intensity. It tends to be brighter in the center than out at its edges. Therefore, if entrance pupil 74 is aligned with the bright central portion of the cone of light, the image formed at arrow 78 will be brighter than if entrance pupil 74 is aligned with an edge portion of the cone.

As can be readily observed from FIG. 1, alignment of the four optical components, namely, objective lens 54, planar mirror 56, focusing screen 60, and the viewing device 64 (including the entrance pupil 74), is established by the spatial relation of the four housing sections (12, 14, 16, and 18) forming the four-bar linkage. Since these four sections are of fixed length, then the spatial relation may be described in terms of the included angle between any two adjacent housing sections. For example, the total length of the second housing section 14 and the third housing section 16 when measured between pivot points 13, 15, and 17, substantially equals the total length of the first housing section 12 and fourth housing section 18 as measured between pivot points 13, 19, and 17. When the camera is in the folded position as shown in FIG. 2, sections 14 and 16 are aligned and are in overlying relation to housing sections 12 and 18. Using adjacent housing sections 12 and 14 as a reference, the included angle therebetween is essentially zero when the camera is folded. By rotating section 14 to its extended position as shown in FIG. 1, included angle A between sections 14 and 16 approximates 36°.

Figure 3:
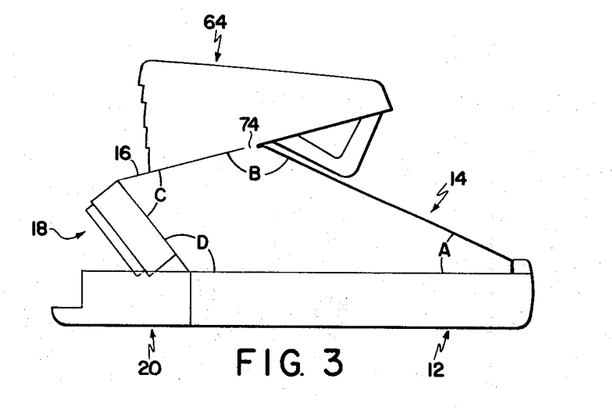
FIG. 3 is a diagrammatic representation of the camera shown in FIG. 1 illustrating the spatial relationship of the camera's housing sections when the camera is located between its folded and extended positions.

FIG. 3 is a diagrammatic representation of camera 10 and is presented to illustrate the net effect of changing (decreasing) the included angle A between housing sections 12 and 14. As angle A decreases, housing section 14 rotates in a counterclockwise direction about pivot 13 and moves planar mirror closer to focusing screen 60 and decreases the angle therebetween. This change causes corresponding changes in the spatial relation of the other housing sections such that the angle B between sections 14 and 16 increases, angle C between sections 16 and 18 decreases and angle D between sections 12 and 18 increases. Housing section 18 is rotated in a counterclockwise direction about pivot point 19 such that the optic axis of lens 54 is positioned to intersect with mirror 56 at a point which is closer to pivot point 15 than that shown in FIG. 1. Also, the location of entrance pupil 74 with respect to planar mirror 56 is shifted. As can readily be seen, a change in the angle A causes a realignment of the four optical elements which results in a change in the optical path therebetween.

Using conventional ray tracing techniques, one skilled in the art will appreciate that the net effect of decreasing the angle A is that the center portion of the distribution of light directed toward entrance pupil 74 is caused to move to the left (as viewed in FIG. 1) or toward pivot point 17. Similarly, increasing the angle A causes the center portion of the distribution of light to move to the right with respect to entrance pupil 74 or towards pivot point 15.

It will be noted that it is necessary to realign all four optical components from the viewing system to maintain the quality of the image formed at arrow 78. While it is convenient to illustrate the change in the geometry of the housing by making a relatively large change in angle A (FIG. 3), it is contemplated that in practice an angular change approximating 1° in either direction from the extended position shown in FIG. 1 will be sufficient to realign the viewing system for optimum brightness. It is interesting to note that while this small angular change significantly improves the performance of the viewing optics, it does not significantly effect the performance of the taking optics during the exposure mode of operation. The change in the position of objective lens 54 compensates for the change in the position of reflective surface 62 on the underside of reflex member 58 resulting in a minimal net change in the taking optical path.

Figure 4:
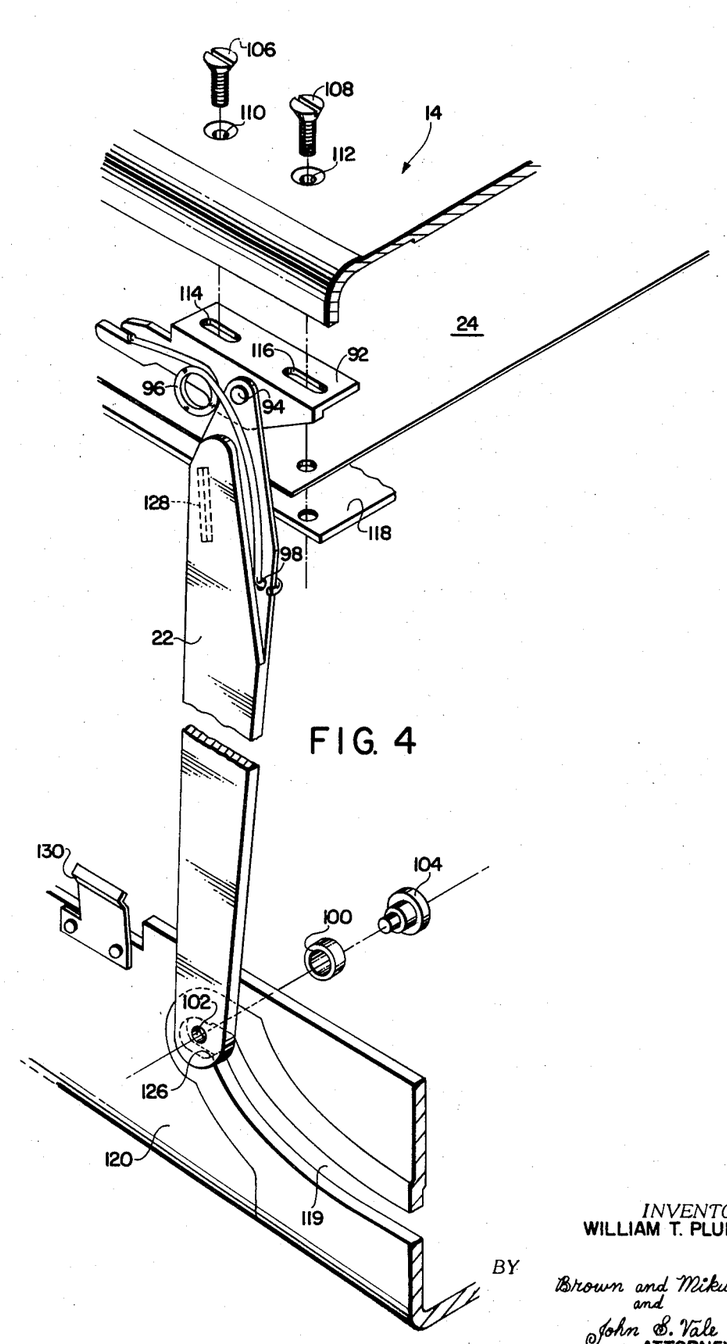
FIG. 4 is an exploded perspective view of the camera's erecting link assembly.

To facilitate making such an angular change, camera 10 is provided with an adjustable erecting link assembly. As best seen in FIG. 4, the assembly includes an elongated link 22; an L-shaped mounting bracket 92 pivotally coupled to the upper end of link 22 by means of a pin 94; an erecting link biasing spring 96 having one end coupled to mounting bracket 92 and the opposite end thereof coupled to link 22 at hole 98; and a roller 100 coupled to the lower end of link 22 at hole 102 by means of a roller connector 104. Mounting bracket 92 is coupled to the interior surface of housing section 14 by means of a pair of screws 106 and 108 adapted to pass through holes 110 and 112 in the outer cover of housing section 14, elongated slots 114 and 116 in mounting bracket 92 and then through appropriate holes in envelope 24 into an envelope mounting frame 118. It will be noted that the elongated slots 114 and 116 permit longitudinal movement of the mounting bracket 92 relative to mounting holes 110 and 112 such that the point of connection of the upper end of link 22 may be varied prior to tightening screws 106 and 108. Roller 100, at the lower end of link 22 is adapted to move within a curved groove or track 119 formed in an interior side wall 120 of housing section 12 between the folded position shown in FIG. 2 and the extended position shown in FIG. 1.

To fold camera 10, erecting link 22 is moved rearwardly from the position shown in FIG. 1 such that it pivots in a counterclockwise direction about pin 94. This motion will cause roller 100 to ride up and over a locking shoulder 126 located near the forward end of guidetrack 119. It will be noted that envelope 24 is formed of an elastomeric material and stretches to permit a sufficient increase in the angle A such that roller 100 may clear locking shoulder 126. Once roller 100 is clear of locking shoulder 126, camera 10 may be folded by moving housing section 14 toward housing section 12. The counter-clockwise rotational movement of housing section 14 is transmitted by a housing section 16 to housing section 18 thereby causing section 18 to rotate in a counterclockwise direction about pivot 19 into the forward portion of housing section 20. Erecting link 22 is provided with a recess 128 located near its upper end which is adapted to receive a spring latch member 130 secured to side wall 120 of housing section 12 for releasably securing housing sections 12, 14, 16, 18 and 20 in the position shown in FIG. 2. An additional latching mechanism may be provided on the opposite side of housing sections 12 and 14 if desired.

During the course of the folding operation, the relative movement of housing sections 14 and 16 is utilized to fold the eye lens 70 of the viewing device 64. Briefly, the outer surface of housing section 14 engages a pair of erecting links 132 coupled between housing sections 16 and the eye lens 70 and causes links 132 to rotate in a counterclockwise direction about pivot point 134 thereby causing the movement of the eye lens 70 to a position which is substantially parallel with and in overlying relation to the exterior surface of housing 14. The curve mirror 68 may be moved to its folded position by rotating viewing device cap 136 in a counterclockwise direction about pivot 138 until latch member 140 located on the interior surface of the viewing device cap 136 engages a mating latch member 142 located on the exterior surface of housing section 14. For a detailed description as to the construction and operation of viewing device 64, reference may be had to the previously mentioned copending application, Ser. No. 141,554.

Camera 10 may be erected by reversing the folding procedure. First, the viewing device cap 136 is unlatched and then housing section 14 is pivoted about pivot point 13. It will be noted that during the erecting operation, bias spring 96 provides a force which tends to pivot erecting link 22 in a clockwise direction about pivot 94 such that erecting link 22 moves along track 119 with sufficient inertia for roller 100 to override locking shoulder 126.

To check the alignment of the camera's viewing system, a source of light is placed near eye station 66 such that an image of the viewing device entrance pupil 74 may be observed by looking through objective lens 54 into exposure chamber 26. When the camera's viewing system is properly aligned, a rectangular shaped image 122 of entrance pupil 74 will appear at a location approximately forty thousandths of an inch below the center line or optic axis of lens 54 (See FIG. 5). Should the viewing system be misaligned, the image will appear either above or below the desired location 122 as represented by the dotted rectangular image 124. The misaligned condition represented by image 124 may be corrected by loosening erecting link mounting bracket 92 and moving it toward pivot point 13 to increase the angle A between housing sections 12 and 14. If the image of the viewing device entrance pupil 74 is observed to be above the desired location, then bracket 92 is moved toward pivot 15 to decrease angle A. Once angle A has been adjusted sufficiently to move the image of entrance pupil 74 to the desired location, the bracket then may be secured and the mounting screws 106 and 108 immobilized, e.g., covering them with cement or an epoxy resin to prevent tampering with the adjustment.

In summary, a folding, single lens, reflex camera has been disclosed which utilizes the kinematic principles of a four-bar linkage for moving components of the camera's optical system between folded and extended position. It was shown that the alignment of the camera's viewing system depends on the static geometry of the camera's housing when located in the extended position and that the static geometry may be described in terms of the angular relation of two of the four housing sections forming the four-bar linkage. A method has been disclosed for observing the alignment of the viewing system and means in the form of an adjustable erecting link assembly have been provided to adjust the angular relation of the two sections for optimum image brightness.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Photographic apparatus comprising:
    a variable geometry housing for supporting an optical system, said housing including at least first and second sections whose angular relation determines the geometry of said housing;
    an optical system, operative in a viewing mode for providing a viewable image of a scene, so supported by said housing that the brightness of the viewable image is dependent upon the geometry of said housing; and
    means for adjusting the angular relation of said first and second housing sections to vary the geometry of said housing for optimum brightness of the viewable image.

2. Photographic apparatus as defined in claim 1 wherein said variable geometry housing is movable between folded and extended positions and the brightness of said image is dependent upon the angular relation of said first and second sections located in said extended position.

3. Photographic apparatus as defined in claim 2 wherein said means for adjusting the angular relation of said first and second sections includes erecting means connected between said first and second sections for releasably securing said first and second sections in said extended position and means for varying the point of connection of said erecting means to one of said first and second sections.

4. Photographic apparatus as defined in claim 1 wherein said variable geometry housing further includes third and fourth housing sections interconnected with said first and second sections to form a four-bar linkage configured for movement between folded and extended positions.

5. Photographic apparatus as defined in claim 4 wherein said optical system includes at least four optical components each of which is supported by one of said first, second, third, and fourth sections for movement therewith between said folded position and said extended position wherein said four optical components are disposed to establish an optical path therebetween such that said optical system is operative to provide said image.

6. Photographic apparatus as defined in claim 5 wherein said four optical components include a focusing screen supported by said first section, a mirror supported by said second section, a viewing device supported by said third section and an objective lens supported by said fourth section.

7. Photographic apparatus as defined in claim 6 wherein said first and second sections are interconnected to form adjacent links in said four-bar linkage and the brightness of said image is dependent upon an included angle between said first and second sections when said variable geometry housing is located in said extended position.

8. Photographic apparatus as defined in claim 7 wherein said means for adjusting the angular relation of said first and second sections includes erecting means adapted to be connected between said first and second sections for releasably securing said variable geometry housing in said extended position and means for varying the point of connection of said erecting means to said second housing section for varying the angle at which said erecting means releasably secures said first and second sections in said extended position.

9. Photographic apparatus as defined in claim 1 wherein said optical system includes an objective lens for forming an image of a scene, a viewing device for viewing said image and means establishing an optical path between said objective lens and said viewing device.

10. Photographic apparatus as defined in claim 9 wherein said optical path between said objective lens and said viewing device may be varied by varying the angular relation of said first and second housing sections.

11. Photographic apparatus as defined in claim 10 wherein said means for establishing an optical path between said objective lens and said viewing device include a focusing screen and a planar mirror.

12. Photographic apparatus as defined in claim 11 wherein said focusing screen is supported by said first housing section and said planar mirror is supported by said second housing section.

13. Photographic apparatus as defined in claim 1 wherein said variable geometry housing is movable between a folded position and an extended position defined by the angular relation of said first and second sections and said means for adjusting the angular relation of said first and second sections includes an erecting link coupled between said first and second sections for releasably securing said first and second sections in said extended position and means for adjusting the point of connection of said erecting link to said second section for varying the angular relation at which said erecting means releasably secures said first and second sections in said extended position.

14. Photographic apparatus as defined in claim 1 wherein the brightness of said viewable image is dependent upon the spatial relation of at least four optical components mounted on said variable geometry housing.

15. Photographic apparatus as defined in claim 14 wherein three of said optical components are moved in a predetermined manner relative to said fourth optical component in response to changing the angular relation of said first and second sections thereby changing the spatial relation of said four optical components to cause a change in the brightness of said image.

16. Photographic apparatus as defined in claim 15 wherein said three optical components include an objective lens, a planar mirror and a viewing device, and said fourth optical component includes a focusing screen.

17. A folding, single lens reflex camera comprising:

a variable geometry housing including at least first, second, third and fourth sections interconnected in a four-bar linkage for movement between a folded position and an extended position wherein the geometry of said housing may be defined in terms of an included angle between two adjacent housing sections forming said four-bar linkage;

an optical system operative in a viewing mode for providing an image of a scene, said optical system including at least four optical components each supported by one of said four housing sections for movement therewith between said folded position and said extended position wherein said four housing sections position said four optical components in operative relation such that the brightness of said image is dependent upon the geometry of said housing;

erecting means connected between said two adjacent housing sections for releasably securing said four housing sections in said extended position; and means for adjusting the included angle between said two adjacent housing sections at which said erecting means releasably secures said four sections in said extended position such that the geometry of said housing may be varied for optimum image brightness.

18. A folding, single lens reflex camera as defined in claim 17 wherein said four optical components include a focusing screen supported by said first housing section, a planar mirror supported by said second housing section, a viewing device including an entrance pupil supported by said third housing section and an objective lens supported by said fourth housing section such that when said variable geometry housing is located in said extended position an optical path is established whereby light passing through said objective lens is reflected by said planar mirror onto said focusing screen to form an image of a scene and light emanating from said image on said focusing screen is directed toward said planar mirror from where it is reflected through said entrance pupil into said viewing device which is operative to form a second image of the scene.

19. A folding, single lens reflex camera as defined in claim 18 wherein said two adjacent housing sections are said first and second housing sections.

20. A folding, single lens reflex camera as defined in claim 19 wherein said erecting means include an erecting link and said means for adjusting the included angle between said first and second housing sections at which said erecting link releasably secures said variable geometry housing in said extended position includes a bracket for coupling one end of said erecting link to said second housing section.

21. A folding, single lens reflex camera as defined in claim 20 wherein said bracket is configured such that the point of connection between said one end of said erecting link and said second housing section may be varied.

22. A folding, single lens reflex camera as defined in claim 21 wherein the opposite end of said erecting link includes a roller adapted to ride within a guidetrack formed in a side wall of said first housing section for movement between folded and extended positions.

23. A folding, single lens reflex camera as defined in claim 22 wherein said guidetrack includes a locking shoulder at one end thereof and said erecting means further includes biasing means for biasing said erecting link toward its extended position.

24. A folding, single lens reflex camera as defined in claim 23 wherein said biasing spring imparts sufficient inertia to said erecting link such that said roller at one end of said erecting link may override said locking shoulder as said camera is moved to its extended position.

25. A folding, single lens reflex camera as defined in claim 24 wherein said erecting link further includes a recess and said first housing section supports a latching member which is adapted to cooperate with said recess when said camera is in said folded position for releasably securing said second housing section to said first housing section.

26. A folding, single lens reflex camera as defined in claim 1 wherein said four housing sections are pivotally interconnected and the total length of said second and third housing sections substantially equals the total length of said first and fourth housing sections as measured between pivot points to permit said variable geometry housing to be folded into a compact parallelepiped shaped structure.

27. A method for aligning a viewing system for optimum image brightness in a folding, single lens, reflex camera of the type comprising a variable geometry housing including at least first, second, third and fourth sections interconnected in a four-bar linkage for movement between a folded position and an extended position, an optical system including a focusing screen supported by said first section, a mirror supported by said second section, a viewing device including an entrance pupil supported by said third section and an objective lens supported by said fourth section, said optical system being operative in a viewing mode to provide an image of a scene when said housing is located in said extended position and erecting means coupled between said first and second housing for releasably retaining said housing in said extended position defined by an included angle between said first and second sections, said method comprising the steps of:

moving said variable geometry housing to its extended position;

observing the location of an image of said viewing device entrance pupil with respect to the optic axis of said objective lens by viewing said image of said entrance pupil through said objective lens; and adjusting the included angle between said first and second sections to relocate said image of said entrance pupil with respect to the optic axis of said objective lens for optimum brightness of the image provided by said viewing system.

28. The method set forth in claim 27 when in said included angle between said first and second sections is adjusted by varying the point of connection of said erecting means to said second housing section.

29. The method set forth in claim 27 wherein decreasing said included angle between said first and second housing sections causes said image of said entrance pupil to move in first direction with respect to said optic axis of said objective lens and increasing said included angle causes said image of said entrance pupil to move in a direction opposite said first direction.

* * * * *